United States Patent
Hsu et al.

(10) Patent No.: US 9,762,312 B2
(45) Date of Patent: Sep. 12, 2017

(54) SIGNAL TESTING APPARATUS AND METHODS FOR VERIFYING SIGNALS IN SATELLITE SYSTEMS

(71) Applicant: The Aerospace Corporation, El Segundo, CA (US)

(72) Inventors: Jason Hsu, Cerritos, CA (US); Rouh T. Bow, Rolling Hills Estates, CA (US)

(73) Assignee: The Aerospace Corporation, El Segundo, CA (US)

( * ) Notice: Subject to any disclaimer, the term of this patent is extended or adjusted under 35 U.S.C. 154(b) by 194 days.

(21) Appl. No.: 13/874,362

(22) Filed: Apr. 30, 2013

(65) Prior Publication Data

US 2014/0321518 A1    Oct. 30, 2014

(51) Int. Cl.
  *H04B 17/00*    (2015.01)
  *H04B 7/185*    (2006.01)
  *H04B 17/10*    (2015.01)

(52) U.S. Cl.
  CPC ....... *H04B 7/18519* (2013.01); *H04B 17/104* (2015.01)

(58) Field of Classification Search
  CPC ........ G01S 19/235; G01S 19/23; G01S 19/42; G01S 19/52; G01S 19/25; H04B 17/00; H04B 17/104; H04B 7/18519
  See application file for complete search history.

(56) References Cited

U.S. PATENT DOCUMENTS

| | | | |
|---|---|---|---|
| 5,922,041 A * | 7/1999 | Anderson | 701/468 |
| 7,432,856 B1 * | 10/2008 | Hornbostel | G01S 1/028 342/169 |
| 7,466,264 B2 | 12/2008 | Lamance et al. | |
| 7,538,726 B1 | 5/2009 | Tester et al. | |
| 7,668,629 B2 | 2/2010 | DiEsposti et al. | |
| 7,743,177 B2 | 6/2010 | Jia et al. | |
| 7,948,435 B2 | 5/2011 | Harper et al. | |

(Continued)

OTHER PUBLICATIONS

Kenn Gold and Alison Brown, "Architecture and Performance Testing of a Software GPS Receiver for Space-based Applications", NAVSYS Corporation, Proceedings of IEEEAC, Big Sky, Montana, Mar. 2004.*

(Continued)

*Primary Examiner* — Aristocratis Fotakis (74) *Attorney, Agent, or Firm* — Manita Rawat; Duane Morris LLP (57) ABSTRACT

A signal testing apparatus is provided. The signal testing apparatus generally comprises a recording device that is configured to receive a plurality of signals representative of a plurality of electromagnetic waves that correspond to a pre-defined period of time. The recording device is further configured to record a plurality of digital representations of the signals such that each digital representation corresponds to a separate signal. A processing device is coupled to the recording device, wherein the processing device is configured to introduce at least one operational parameter to each of the digital representations. A play-back assembly is coupled to the recording device and to the processing device, wherein the play-back device is configured to play each of the digital representations simultaneously in real-time to facilitate verification of each of the signals.

18 Claims, 3 Drawing Sheets

(56) References Cited

U.S. PATENT DOCUMENTS

| | | | |
|---|---|---|---|
| 8,013,789 | B2 | 9/2011 | van Graas et al. |
| 8,018,379 | B1 | 9/2011 | Sun et al. |
| 8,044,852 | B2 | 10/2011 | Green et al. |
| 8,046,169 | B2 | 10/2011 | Mazlum et al. |
| 8,077,086 | B2 | 12/2011 | Huang et al. |
| 8,116,354 | B2 | 2/2012 | Chen |
| 8,125,378 | B1 | 2/2012 | Jarpenvaa |
| 8,159,391 | B2 | 4/2012 | Papadimitratos et al. |
| 8,193,979 | B2 | 6/2012 | McBurney |
| 8,217,832 | B2 | 7/2012 | Thomson et al. |
| 2002/0053989 | A1* | 5/2002 | Lin et al. .................. 342/357.14 |
| 2004/0006424 | A1 | 1/2004 | Joyce et al. |
| 2006/0071851 | A1* | 4/2006 | Graas et al. ............. 342/357.14 |
| 2006/0100846 | A1* | 5/2006 | Lee et al. ........................ 703/22 |
| 2009/0091495 | A1* | 4/2009 | Meyers .................. G01S 19/23 342/357.48 |
| 2009/0243914 | A1* | 10/2009 | Song et al. .................... 342/169 |
| 2010/0001898 | A1* | 1/2010 | Fu et al. ........................ 342/174 |
| 2011/0068973 | A1 | 3/2011 | Humphreys et al. |
| 2011/0184644 | A1* | 7/2011 | McBurney ............. G01C 21/12 701/532 |
| 2011/0244891 | A1 | 10/2011 | Ghinamo |
| 2014/0253372 | A1* | 9/2014 | Davis ..................... G01S 19/23 342/357.42 |

OTHER PUBLICATIONS

Alison Brown, Neil Gerein, and Keith Taylor, "Modeling and Simulation of GPS Using Software Signal Generation and Digital signal Reconstruction", Proceedings of the ION National Technical Meeting, Jan. 2000, Anaheim, CA.*

Alison Brown, Jarrett Redd, and Mark-Anthony Hutton, "Simulating GPS Signals—It Doesn't Have to Be Expensive",GPS World, May 2012.*

Zhilin Zhu and Jinxue Sui, "Design and Implementation of Small Satellite Flexible Test Bed", Shandong Institute of Business and Technology, China, IEEE, Jun. 2011.*

Alison Brown, Jarrett Redd and Mark-Anthony Hutton, "Simulating GPS Signals—It Doesn't Have to Be Expensive", GPS World, May 2012.*

Farrow, C.W., A Continuously Variable Digital Delay Element, AT&T, Middletown, NJ, 1988.

GSS8000 Multi-GNSS Constellation Stimulator, Spirent Communications plc, available at http://www.spirent.com/Products/GSS8000 last visited Mar. 4, 2013.

Erup, Lars et al., Interpolation in Digital Modems—Part II: Implementation and Performance, IEEE Transactions on Communications, vol. 41, No. 6, Jun. 1993.

RF Record and Playback System, National Instruments Corporation, available at http://sine.ni.com/nips/cds/print/p/lang/en/nid/206806 last visited Mar. 4, 2013.

* cited by examiner

SIGNAL TESTING APPARATUS AND METHODS FOR VERIFYING SIGNALS IN SATELLITE SYSTEMS

STATEMENT OF GOVERNMENT INTEREST

This invention was made with government support under Contract No. FA8802-09-C-0001 awarded by the Department of the Air Force. The government has certain rights in the invention.

BACKGROUND

The field of the invention relates generally to systems and, more particularly, to a signal testing apparatus that may be used with systems to verify signals, such as radio frequency (RF) signals.

At least some known systems, such as global navigation satellite systems (GNSSs), include a plurality of global navigation satellite vehicles (SVs) that provide autonomous geo-spatial positioning with global coverage. Such systems enable receivers, such as GNSS receivers, to determine their location (i.e., longitude, latitude, and altitude) to within a pre-defined distance using time signals, such as time RF signals, that are transmitted by radio transmitters from the SVs.

However, there are limitations as to how the receivers can test or verify the RF signals that are being transmitted by the SVs. For example, the receivers need to simultaneously track and measure the RF signals transmitted by at least 4 orbiting GNSS SVs in order to compute the receiver's position, velocity, and time (PVT) solutions. More specifically, the receivers are unable to form a PVT solution while the SV is on the ground. As a result, pre-launch verification of a SV involving actual receivers is limited to static tracking-only tests. These tests are considered inadequate in revealing issues that manifest when PVT solutions can be formed in a dynamic environment. Therefore, it can be difficult to verify the interoperability between receivers and a full constellation of SVs in space while the SVs are in the development stage. Moreover, it can be substantially cost prohibitive and difficult to fix implementation issues post-launch.

BRIEF DESCRIPTION

In one embodiment, a signal testing apparatus is provided. The signal testing apparatus includes a recording device that is configured to receive a plurality of signals representative of a plurality of electromagnetic waves that correspond to a pre-defined period of time. The recording device is further configured to record a plurality of digital representations of the signals such that each digital representation corresponds to a separate signal. A processing device is coupled to the recording device, wherein the processing device is configured to introduce at least one operational parameter to each of the digital representations. A play-back assembly is coupled to the recording device and to the processing device, wherein the play-back device is configured to play each of the digital representations simultaneously in real-time to facilitate verification of each of the signals.

In another embodiment, a system is provided. The system includes a satellite vehicle that is configured to transmit a plurality of signals that are representative of a plurality of electromagnetic waves corresponding to a pre-defined period of time. The system also includes a signal testing apparatus that is coupled to the satellite vehicle and a receiver that is in communication with the signal testing apparatus. The signal testing apparatus includes a recording device that is configured to receive each of the signals. The recording device is further configured to record a plurality of digital representations of the signals such that each digital representation corresponds to a separate signal. A processing device is coupled to the recording device, wherein the processing device is configured to introduce at least one operational parameter to each of the digital representations. A play-back assembly is coupled to the recording device and to the processing device, wherein the play-back device is configured to play each of the digital representations simultaneously in real-time to facilitate verification of each of the signals.

In yet another embodiment, a method of verifying a plurality of signals is provided. A plurality of signals representative of a plurality of electromagnetic waves corresponding to a pre-defined period of time is received via a recording device. A plurality of digital representations of the signals is recorded by the recording device such that each digital representation corresponds to a separate signal, within the same pre-defined period of time. At least one operational parameter is introduced to each of the digital representations via a processing device that is coupled to the recording device. Each of the digital representations is played simultaneously in real-time, via a play-back assembly that is coupled to the recording device and to the processing device, to facilitate verification of each of the plurality of signals.

DETAILED DESCRIPTION

The exemplary systems, apparatus, and methods described herein overcome at least some known disadvantages associated with at least some known systems by providing a system that is enabled to test or verify signals while a satellite vehicle (SV) is grounded. More specifically, the embodiments described herein provide a signal testing apparatus that may be used with the system, wherein the signal testing apparatus is configured to facilitate the production of a virtual constellation of global navigation satellite system (GNSS) signals with which receivers can navigate. The embodiments described herein use a plurality of radio frequency (RF) signals that are transmitted in a sequence by a single SV under laboratory test conditions. The signal testing apparatus is configured to record the signals received from the single SV, process the recordings, and then combine the recordings into a new recording that appears as a multitude of signals from an entire constellation in space. A position, velocity, and time (PVT) solution can then be obtained when this new recording is played back in real-time to a GNSS receiver.

Figure 1:
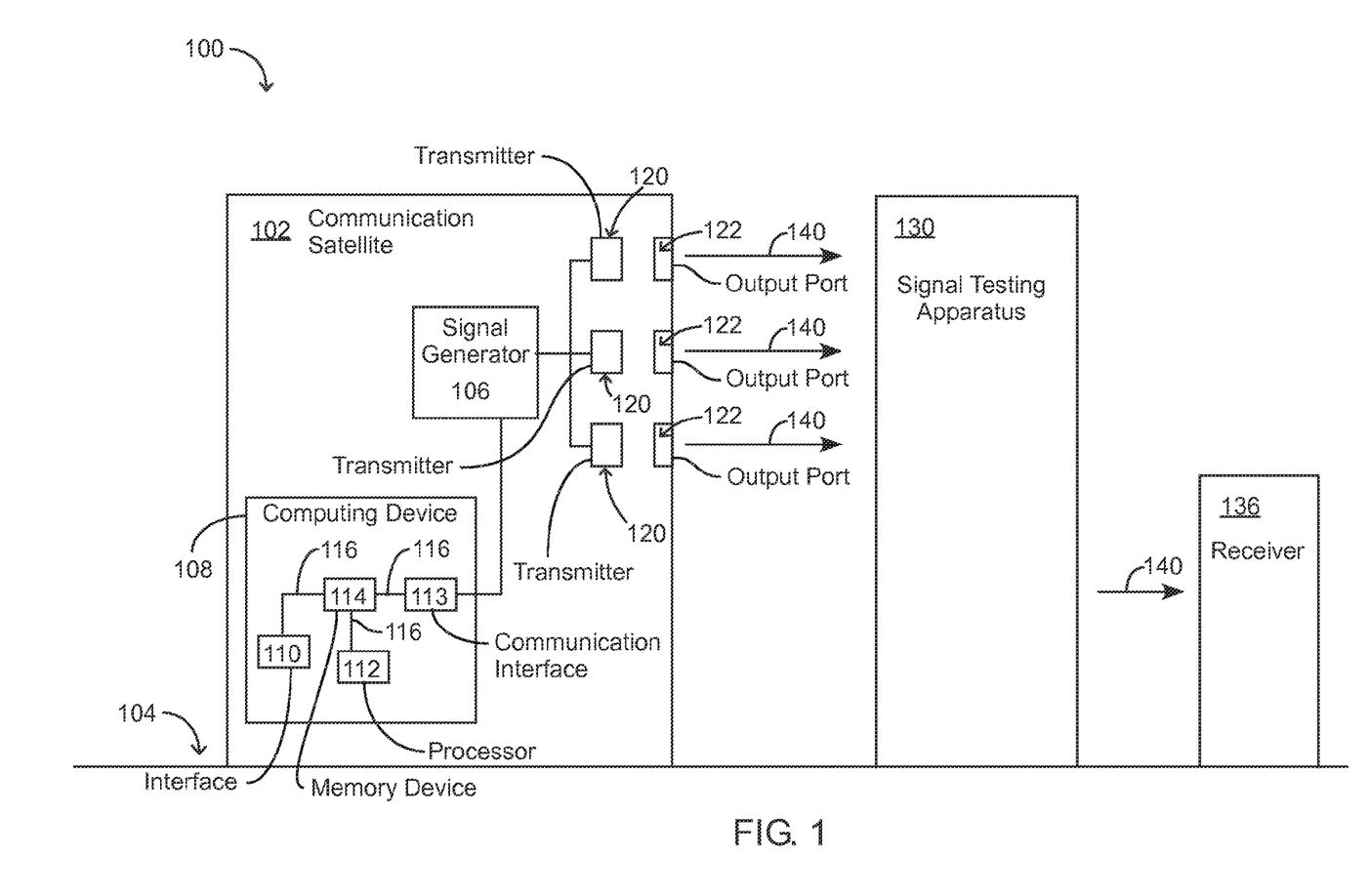
FIG. 1 is an exemplary system.

FIG. 1 is a block diagram of an exemplary system 100. More specifically, in the exemplary embodiment, system 100 includes a GNSS SV. While the exemplary embodiment illustrates system 100 as including a GNSS SV, the present disclosure is not limited to GNSSs and may be used with other types of communication systems. System 100 includes a communication satellite or SV 102 that is configured to be placed into orbit by, for example, human endeavor. However, in the exemplary embodiment, SV 102 is positioned on a ground 104 for a testing condition. That is, system 100 is enabled to conduct signal testing or verification while SV 102 is grounded.

In the exemplary embodiment, SV 102 is configured to generate electromagnetic waves. More specifically, SV 102 includes a signal generator 106 that is configured to generate one or more electrical signals in the frequency range of about 3 kHz to about 300 GHz, which corresponds to the frequency of radio waves (referred to herein as "RF signals"). Moreover, signal generator 106 may be configured to generate one or more signals in other frequencies/ranges, such as, for example, optical frequencies. Signal generator 106 is coupled to a computing device 108. It should be noted that, as used herein, the term "couple" is not limited to a direct mechanical, electrical, and/or communication connection between components, but may also include an indirect mechanical, electrical, and/or communication connection between multiple components.

In the exemplary embodiment, computing device 108 may be any type of computing device, such as a netbook, a desktop computing device, a laptop computer, or a handheld computing device. As such, computing device 108 includes a user interface 110 that is configured to receive at least one input from a user. In the exemplary embodiment, user interface 110 may include a keyboard, a pointing device, a mouse, a stylus, a touch sensitive panel (e.g., a touch pad or a touch screen), a gyroscope, an accelerometer, a position detector, and/or an audio input interface (e.g., including a microphone). Computing device 108 also includes a processor 112, a communication interface 113, and a memory device 114. In the exemplary embodiment, processor 112 is coupled to user interface 110, communication interface 113, and memory device 114 via a system bus 116. In the exemplary embodiment, processor 112 communicates with a user, such as by prompting the user via a presentation interface (not shown) and/or by receiving user inputs via user interface 110. Moreover, in the exemplary embodiment, processor 112 is programmed by encoding an operation using one or more executable instructions and providing the executable instructions in memory device 114. Processor 112 can also communicate with signal generator 106 via communication interface 113. For example, the user may input various parameters related to the generation of the electrical signals into computing device 108 and such parameters may be communicated to signal generator 106 to control various aspects of the signal generating process.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, SV 102 also includes a plurality of transmitters 120 that are each coupled to signal generator 106 and that are each configured to transmit the signals that are generated by signal generator 106. More specifically, in the exemplary embodiment, each transmitter 120 transmits the individual component of a composite signals (e.g. L1 and L2 frequency components of GPS signals) SV 102 also includes a plurality of output ports 122 such that one output port 122 is positioned proximate to a different transmitter 120 such that the same RF signals can be transmitted from any of the output ports 122 to a signal testing apparatus 130. Various connections may be available between SV 102 and signal testing apparatus 130, including but not limited to a low-level serial data connection, such as Recommended Standard (RS) 232 or RS-485, a high-level serial data connection, such as Universal Serial Bus (USB) or Institute of Electrical and Electronics Engineers (IEEE®) 1394, a parallel data connection, such as IEEE® 1284 or IEEE® 488, a short-range wireless communication channel such as BLUETOOTH®, and/or a private (e.g., inaccessible system) network connection, whether wired or wireless.

System 100 also includes a receiver 136 that is in communication with signal testing apparatus 130 by, for example, one of the varying types of connections described above. In the exemplary embodiment, receiver 136 may be used with an antenna (not show) to receive signals from signal testing apparatus 130. In the exemplary embodiment, receiver 136 may be any suitable type of receiver, such as a GNSS or a global positioning system (GPS) receiver. Receiver 136 may also be a receiver on a smart phone.

During operation of system 100, the RF signals that are generated and emitted by SV 102 may be tested while SV 102 is positioned on ground 104. Prior to the signals being generated, several parameters may be defined and provided by a user to computing device 108 via user interface 110 such that the parameters may be modulated onto the RF signals that are being generated and emitted. For example, a pre-defined period of time may be defined such that signal generator 106 generates RF signals corresponding to what SV 102 would transmit in orbit over the pre-defined period of time, wherein the signals are transmitted serially or sequentially to signal testing apparatus 130. As such, SV 102 is configured to transmit RF signals as different space vehicle identifications (SVIDs) all within the same pre-defined period of time serially or sequentially.

In the exemplary embodiment, the user may define a start time and an end time of the scenario, denoted as $T_0$ and $T_{End}$, respectively. The time may refer to the testing scenario's time for system 100. For example, the time may be a day of a week and an hour or second of the day. Receiver position P(t) and velocity V(t) from t=as $T_0$ and $T_{End}$ may also be defined. Valid SV 102 ephemeris may also be defined by the user and denoted as $EPH_i$, for all SVID={i∈V}, wherein V is the set of all SVs 102 that are visible to receiver 136 during either part or the entirety of the testing scenario. If the exact orbits of SV 102 are not of interest to the user, historical ephemeris data of actual known GNSS constellation may be used.

Based on these pre-defined parameters, signal generator 106 generates a plurality of RF signals such that separate components of the signal may be transmitted simultaneously from a separate transmitter 120 to a separate output port 122. The RF signals are transmitted to signal testing apparatus 130 and then to receiver 136 via the flow path illustrated by arrows 140. As described above, the RF signals defined within $T_0$ to $T_{End}$ are transmitted to signal testing apparatus 130 via a sequence or serially for all SVID={i∈V}. For example, a first signal defined within $T_0$ to $T_{End}$ for SVID 1 may be transmitted to signal testing apparatus 130. Then, a second signal also defined within $T_0$ to $T_{End}$ SVID 2 may be transmitted to signal testing apparatus 130. Third and fourth signals for SVID 3 and 4, respectively, defined within $T_0$ to $T_{End}$ may follow.

As explained in more detail below with respect to FIGS. 2 and 3, when signal testing apparatus 130 receives the RF signals, signal testing apparatus 130 is able to record the signals and provide a play-back of the signals to receiver 136. More specifically, signal testing apparatus 130 records a plurality of digital representations of the RF signals such that each digital representation corresponds to a separate RF signal. At least one operational parameter based on motion dynamics may be introduced to each of the digital representations. For example, when the RF signals travel through space, propagation delays as measured by receiver 136 may be distorted due to ionospheric and/or tropospheric delays, SV clock offsets, multipath effects, and many other known factors. As such, in the exemplary embodiment, a Doppler Effect and/or one or more propagations delays as measured by receiver 136 may be introduced to each of the digital representations. Signal testing apparatus 130 can also play back each of the digital representations in real-time to receiver 136 such that each of the RF signals can be verified. More specifically, a PVT solution can be obtained when the processed digital representations are combined by summation and played back to receiver 136.

Accordingly, system 100 is able to produce a virtual constellation of RF signals with which receiver 136 can navigate by using a plurality of signals that are transmitted by SV 102 under laboratory test conditions while SV is on ground 104. As such, pre-launch verification of an SV involving actual receivers are no longer limited to static tracking-only tests and the interoperability between receivers and a full constellation of SVs in space while the SVs are in the development stage can be readily verified.

Figure 2:
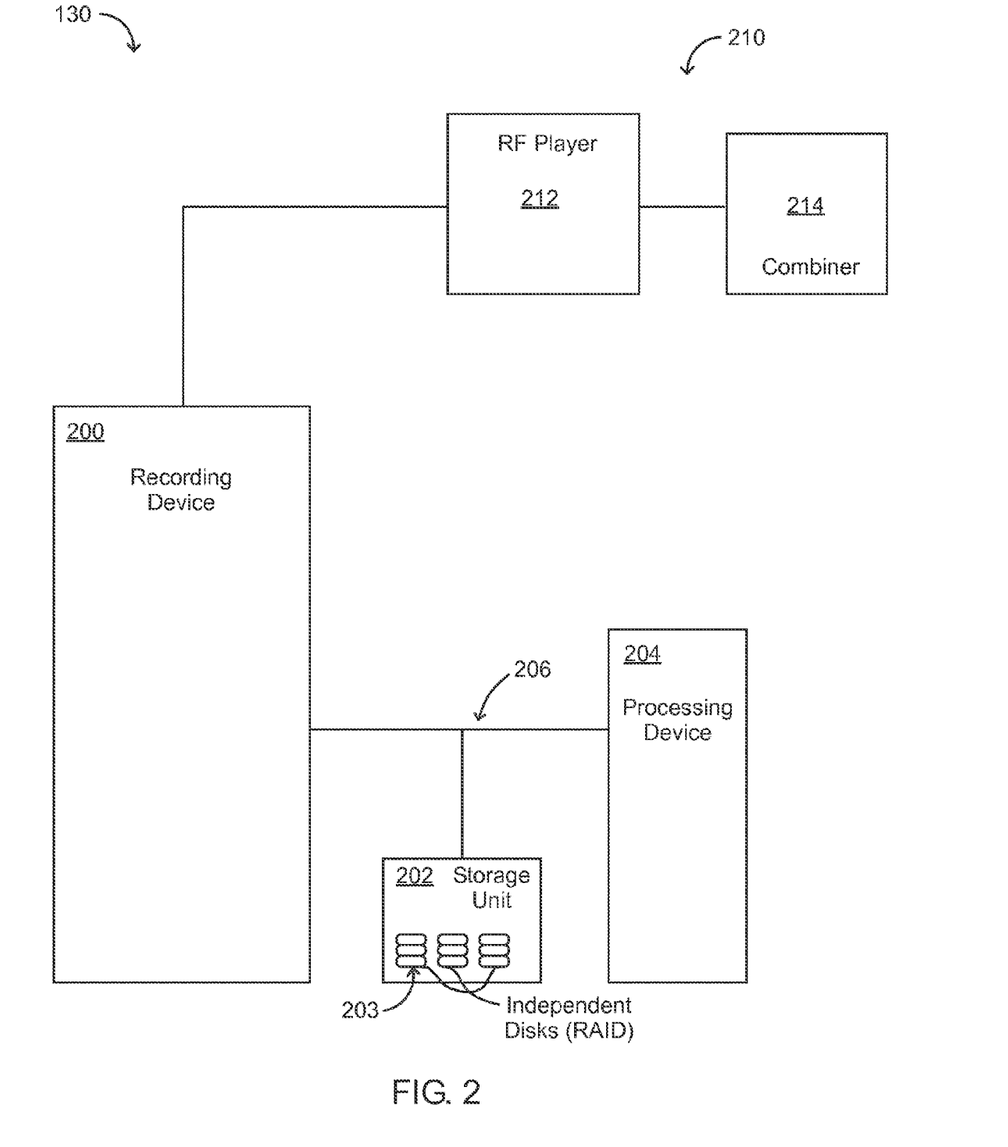
FIG. 2 is an exemplary signal testing apparatus that may be used with the system shown in FIG. 1.
Figure 3:
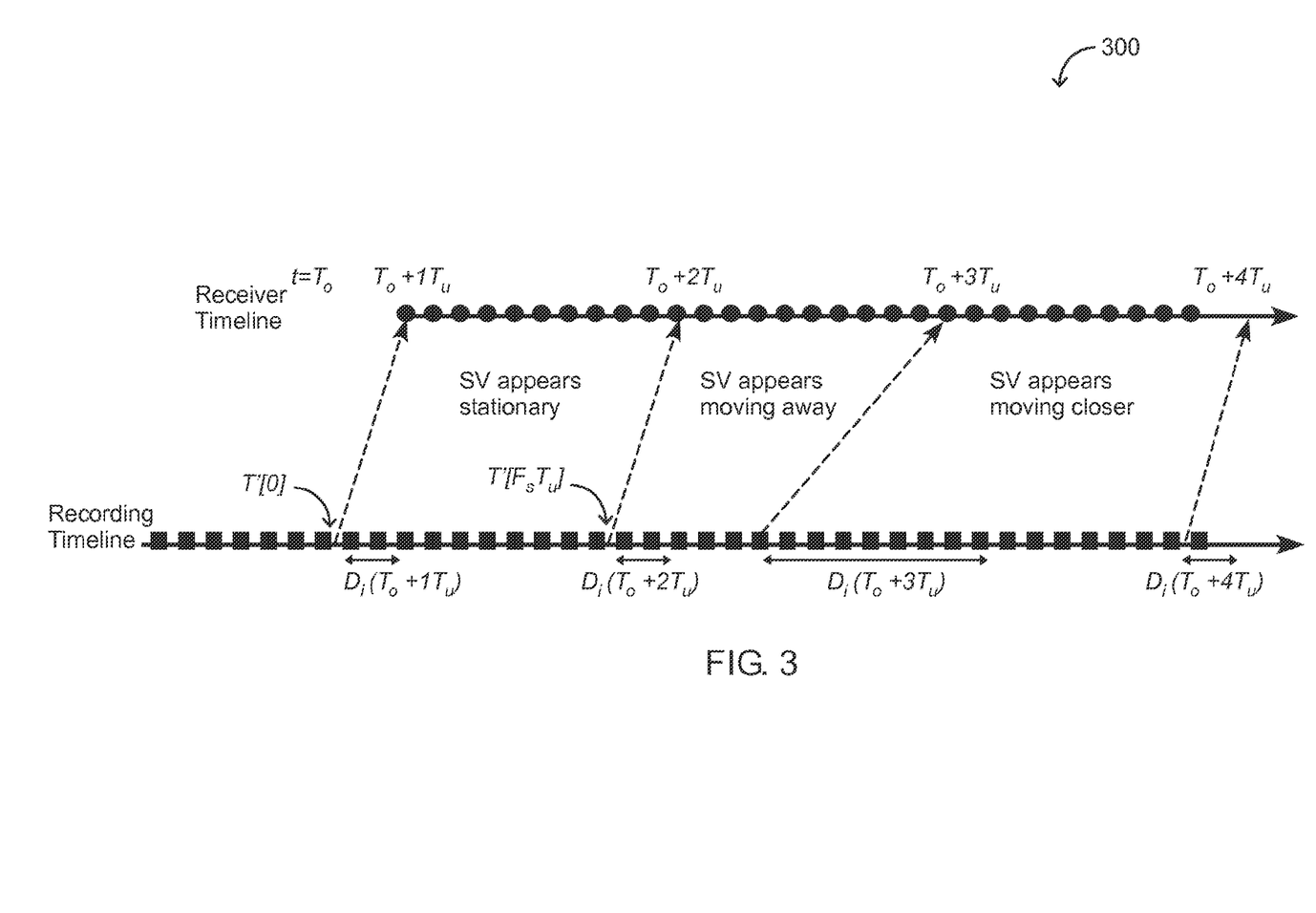
FIG. 3 is a graphical representation of a timing relationship between components of the system shown in FIG. 1.

FIG. 2 illustrates a block diagram of signal testing apparatus 130. In the exemplary embodiment, signal testing apparatus includes a recording device 200 that is configured to receive the RF signals that are being transmitted from SV 102 (shown in FIG. 1). More specifically, recording device 200 is a multi-channel RF recorder, wherein each channel (not shown) is configured to capture RF signals with up to 50 MHz of bandwidths at a range of center frequencies. In one embodiment, the channels of recording device 200 correspond to output ports 122 (shown in FIG. 1) of SV 102 such that the varying connections described above may be between each output port 122 and each of the channels.

In the exemplary embodiment, recording device 200 is configured to record a plurality of digital representations of the RF signals received from SV 102 such that each digital representation corresponds to a separate RF signal. In one embodiment, recording device 200 is configured to covert analog signals received from SV 102 to digital signals. Recording device 200 is also configured to store the recordings to a storage unit 202 that is coupled to recording device 200. More specifically, in the exemplary embodiment, storage unit 202 includes a redundant array of independent disks (RAID) 203 that are each configured to store several hours of continuous RF recordings.

A processing device 204 is coupled to recording device 200 and to storage unit 202 via a data conduit 206. Processing device 204 is configured to process and/or analyze the signals and/or recordings received from recording device 200 and/or storage unit 202. As used herein, the term "process" refers to performing an operation on, adjusting, filtering, buffering, and/or altering at least one characteristic of a recording and/or a signal. For example, processing device 204 may be a computing device that includes a circuit (not shown) or a processor (not shown) such that processing device 204 can be configured to utilize either analog or digital signal processing techniques as well as using a hybrid mix of the two to generate an output that is representative of the signals and/or recordings received from recording device 200 and/or storage unit 202. In one embodiment, processing device 204 may be configured to introduce at least one operational parameter, such as a Doppler Effect and/or one or more propagations delays, to each of the digital representations.

Signal testing apparatus 130 further includes a play-back assembly 210 coupled to recording device 200, processing device 204, and/or storage unit 202. In one embodiment, play-back assembly 210 may include an RF player 212 and a combiner 214 such that play-back assembly is configured to combine the recordings and play them back to receiver 136 (shown in FIG. 1) in real-time.

During operation, RF signals corresponding to a pre-defined period of time are transmitted to signal testing apparatus 130 from SV 102 via a sequence or serially. More specifically, the RF signals are transmitted simultaneously from each output port 120 of SV 102 to the corresponding channels of recording device 200 within $T_0$ to $T_{End}$. More specifically, each RF signal transmitted from SV 102 corresponds to what an actual SV would transmit from $T_0$ to $T_{End}$. If different frequency bands are already pre-combined at each output port 120 of SV 102, a diplexer (not shown) or triplexer (not shown) can be used to separate the frequency bands into different output ports 120. Alternatively, if a suitable anechoic test chamber (not shown) is available, recordings can be made wirelessly, using appropriate antennas and amplification for each input frequency band to drive each of the recorder inputs. During this time, SV 102 and recording device 200 may need to phase lock onto a common clock reference. This approach may be required to ensure that the signals from the transmitters 120 (shown in FIG. 1) appear completely stationary and are free of any Doppler bias from the perspective of the recording device 200 to clock offset between recording device 200 and SV 102.

The start pulse from SV 102 commences when the transmission of RF signals commence and is used as a trigger signal for recording device 200 to start recording the RF signals being received. This approach guarantees that the beginning of the recording on all the channels aligns precisely with the beginning of transmission at time $T_0$, and recordings from different sessions are aligned among themselves as well. The precision of alignment is crucial to the quality of constellation signal(s) produced in the next step.

In the case that SV 102 is not capable of generating a start pulse, recording can be manually started prior to the start of signal transmission by SV 102. However, post-processing may be required by, for example, processing device 204, in order to locate the actual position of $T_0$ in the recording file. As such, extra samples prior to $T_0$ can be removed. Detection of $T_0$ can be guaranteed because the signals carry timing information inherently. However, other known suitable techniques may be used for the detection of $T_0$.

The recording session for each SVID concludes when the transmission of RF reaches $T_{End}$. These steps are repeated until recordings for each SVID $\{i\epsilon V\}$ are completed. At the conclusion of this step, there should be a collection of recording files that are generated by recording device 200, wherein each file contains the digitized RF signal from time $T_0$ to $T_{End}$ for one frequency band from one SVID. Recording device 200 may store the collection of recording files in storage unit 202.

In order to transform the set of transmitted signals into the combined receiver signals, propagation delays and Doppler Effect need to be introduced into the recordings based on the motion dynamics between receiver 136 and SV 102. As described above, when the RF signals travel in space, the propagation delay as measured by receiver 136 can be distorted slightly due to ionospheric and/or tropospheric delays, SV clock offsets, multipath effect, and many other known factors. The apparent distance from receiver 136 to $SV_i$ from the receiver's perspective is called pseudorange, or $\rho_i(t)$, where i is the SVID and t is the system time. As such, the recordings are transmitted from recording device 200 and/or storage unit 202 to processing device 204, wherein each of the recordings are processes and/or analyzed.

In the exemplary embodiment, processing device 204 may use various mathematical models in simulation software to calculate the value of $\rho_i(t)$ precisely at any time given $EPH_i$, P(t), V(t), carrier frequency, atmospheric models, and other parameters pertaining to the testing scenario. However, such simulation models generally do not compute $\rho_i(t)$, continuously, for all possible value of t. Instead, they compute the values at the epoch(beginning) of a fixed update interval, $T_U$. As such, $\rho_i(t)$, is computed at discrete points in t by Equation 1 below.

$$t = T_0 + M \cdot T_U \qquad \text{Eq. 1}$$

In Equation 1, M is an integer from 0 to $$\text{floor}\left(\frac{T_{End} - T_0}{T_U}\right).$$

$T_U$ is a configurable parameter that can be made smaller for higher precision or made larger to reduce the amount of computation, but it is usually set between about 1 millisecond (ms) to about 50 ms for a testing scenario with moderate dynamics. From $\rho_i(t)$, the propagation delay $D_i(t)$ can be calculated by using Equation 2 below.

$$D_i(t) = \rho_i(t)/c, \qquad \text{Eq. 2}$$

In Equation 2, c is the speed of light in a vacuum. At any time t, receiver 136 receives signal from $SV_i$ transmitted in the past at $t-D_i(t)$. To produce the apparent propagation delay to receiver 136, the recorded signal corresponding to $t-D_i(t)$ should be played back at time t.

The timing relationship can be described via a graphical representation 300 (shown in FIG. 3) as being between the current time at receiver 136 (dotted circles) and the time corresponding to the recorded signal from SV 102 (dotted squares). As previously mentioned, $D_i(t)$, like $\rho_i(t)$, is computed at the beginning of every $T_U$ interval, and the dashed arrows indicate the points where the two timelines should be aligned.

Since $D_i(t)$ changes every epoch, the number of the recorded samples that falls within each $T_U$ change as well. The recorded signal needs to be played back at a different rate during each $T_U$ interval to ensure that the proper alignments are always maintained. In the exemplary embodiment, play-back assembly 210 has a fixed sampling frequency $F_S$. As such, the change of the play-back rate is accomplished by digitally resampling the original signal into a new sample sequence. The precise $D_i(t)$ at any given moment can be found by linear interpolation between epochs. If $Xc_i(t)$ is the continuous-time signal reconstructed from the original recording sequence $X_i[n]$, then the new re-sampled sequence $X_i'[n]$ can be defined pursuant to Equations 3 and 4 below.

$$X_i'[n] = Xc_i(T_i[n]) \qquad \text{Eq. 3}$$

-continued $$T_i[n] = [T_0 + MT_U - D_i(T_0 + MT_U)] + \frac{D_i(T_0 + MT_U) - D_i[T_0 + (M+1)T_U] + T_U}{F_s T_U} \cdot (n \bmod F_s T_U) \qquad \text{Eq. 4}$$

In Equations 3 and 4, $F_s$ is the sampling frequency of play-back assembly 210 in Hz and n is the index of a new sequence (starting from 0). M is defined pursuant to Equation 5 below.

$$M = \text{floor}\left(\frac{n}{F_s T_U}\right) \bigg| 1 \qquad \text{Eq. 5}$$

In the exemplary embodiment, $T_i[n]$ determines the sampling sites for each new sample with index n. $F_s T_U$ represents the number of new samples in a single $T_U$ interval. The first term of $T_i[n]$ enclosed by the square brackets determines the sampling site for the first sample (when n is a multiple of $F_s T_U$) at the beginning of each interval, M, and the second term seeks to evenly space out the sampling sites for the following samples until the next interval starts. More specifically, the sampling period remains constant throughout an interval and is governed by Equation 6 below.

$$\frac{D_i(T_0 + MT_U) - D_i[T_0 + (M+1)T_U] + T_U}{F_s T_U} \qquad \text{Eq. 6}$$

There are many resampling techniques, such as known spline and polyphase filters that can be implemented efficiently in software and hardware of processing device 204 to perform the above step.

In the exemplary embodiment, $X_i'[n]$ represents the signal with the proper propagation delays as a function of time. However, it does not capture the carrier phase shift due to the change of pseudorange with respective to time, which is also measured by receiver 136 to obtain a precise velocity solution.

The carrier phase of the signal, as observed by receiver 136, deviates from that of a Doppler-free signal at the immediate output of one of transmitters 120. The amount of phase shift for each sample is modeled pursuant to Equation 7 below.

$$\theta_i[n] = \left(T_i[n] - \frac{n}{F_S}\right) F_c 2\pi \text{(in radians)}, \qquad \text{Eq. 7}$$

where $F_c$ = Carrier Frequency (Hz)

The term $$\left(T_i[n] - \frac{n}{F_S}\right)$$

is equal to the propagation delay corresponding to each sample n in $X_i'[n]$. In the exemplary embodiment, $X_i''[n]$ is the final product that contains both the correct propagation delays and carrier phase for a signal from SV 102 to receiver 136.

$$X_i''[n] = X_i'[n] e^{j\theta_i[n]} \qquad \text{Eq. 8}$$

The discrete-time virtual constellation signal C[n] is produced by combining $X_i''[n]$ from Equation 8 over all i∈V pursuant to Equation 9 below.

$$C[n]=\Sigma_{i \in V} X_i''[n] \qquad \text{Eq. 9}$$

A separate C[n] needs to be generated for each frequency band. The files that contain C[n] for the different frequency bands are played back synchronously by play-back assembly 210. More specifically, play-back assembly 210 will ensure the phase coherency across all playback channels (not shown). Receiver 136 will then be able to form PVT solutions from the RF signals.

As compared to known signal testing systems or apparatus, the above-described signal testing apparatus is enabled to test or verify signals while an SV is grounded. More specifically, the embodiments described herein provide a signal testing apparatus that may be used with systems, wherein the signal testing apparatus is configured to facilitate the production of a virtual constellation of GNSS signals with which receivers can navigate. The embodiments described herein use a plurality of radio frequency (RF) signals that are transmitted by a single SV under laboratory test conditions. The signal testing apparatus includes a recording device, a processing device, and a playback system. As such, the signal testing apparatus can record the signals received from the single SV, process the recordings, and then combine the recordings into a new recording which appears as a multitude of signals from an entire constellation in space. A PVT solution can then be obtained when this new recording is played back in real-time to a GNSS receiver.

Exemplary embodiments of the systems and methods are described above in detail. The systems, and methods are not limited to the specific embodiments described herein, but rather, components of the systems and/or steps of the method may be utilized independently and separately from other components and/or steps described herein. For example, the system may also be used in combination with other systems and methods, and is not limited to practice with only a monitoring system as described herein. Rather, the exemplary embodiment can be implemented and utilized in connection with many other systems.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A signal testing apparatus comprising: a recorder configured to:
   receive a plurality of signals from a satellite vehicle based on a plurality of different space vehicle identification numbers that are within a same pre-defined period of time; and
   record a plurality of digital representations of the plurality of signals such that each digital representation of the plurality of signals corresponds to a different space vehicle identification number of the plurality of different space vehicle identification numbers that are within the same pre-defined period of time;
a processor coupled to said recorder, said processor is configured to:
   receive each of the plurality of digital representations of the plurality of signals from the recorder;
   interpolate each of the plurality of digital representations of the plurality of signals between a plurality of adjacent sampling points; and
   process the plurality of digital representations of the plurality of signals by re-sampling the plurality of digital representations and multiplying each of the plurality of re-sampled digital representations by a plurality of phase shifting signals;
and
a play-back assembly coupled to said recorder and to said processor, said play-back assembly is configured to:
   combine by summation the processed plurality of digital representations of the plurality of signals representations into a single digital representation of the plurality of signals;
   store the single digital representation of the plurality of signals; and
   play the single digital representation of the plurality of signals in real-time to facilitate verification of the single digital representation of the plurality of signals such that a receiver is enabled to form at least one position, velocity, and time solution based on the verified single digital representation of the plurality of signals.

2. The signal testing apparatus in accordance with claim 1, wherein said recorder is further configured to record sequentially a plurality of recording files that correspond to the plurality of digital representations such that one recording file of the plurality of recording files corresponds to a separate digital representation of the plurality of digital representations.

3. The signal testing apparatus in accordance with claim 1, wherein said recorder is configured to receive each of the plurality of signals in a sequence.

4. The signal testing apparatus in accordance with claim 3, wherein said recorder is configured to record the plurality of digital representations based on the sequence.

5. The signal testing apparatus in accordance with claim 1, wherein said processor is configured to introduce a Doppler Effect and a propagation delay to each of the plurality of digital representations when said processor processes the plurality of digital representations.

6. The signal testing apparatus in accordance with claim 1, wherein said recorder is configured to record the plurality of digital representations of the plurality of signals by digitizing each of the plurality of signals to generate the plurality of digital representations and storing each of the plurality of digital representations onto a storage unit.

7. A system comprising:
   a satellite vehicle configured to transmit a plurality of signals that are representative of a plurality of electromagnetic waves that correspond to a plurality of different space vehicle identification numbers that are within a same pre-defined period of time;
   a signal testing apparatus coupled to said satellite vehicle, wherein said signal testing apparatus comprises:
      a recorder configured to:

receive the plurality of signals from the satellite vehicle based on the plurality of different space vehicle identification numbers that are within the same pre-defined period of time; and record a plurality of digital representations of the plurality of signals such that each digital representation of the plurality of signals corresponds to a different space vehicle identification number of the plurality of different space vehicle identification numbers that are within the same pre-defined period of time;

a processor coupled to said recorder, said processing device is configured to:

receive each of the plurality of digital representations of the plurality of signals from the recorder;

interpolate each of the plurality of digital representations of the plurality of signals between a plurality of adjacent sampling points; and process the plurality of digital representations of the plurality of signals by re-sampling the plurality of digital representations and multiplying each of the plurality of re-sampled digital representations by a plurality of phase shifting signals;

a play-back assembly coupled to said recorder and to said processor, said play-back assembly is configured to:

combine by summation the processed plurality of digital representations of the plurality of signals into a single digital representation of the plurality of signals; and store the single digital representation of the plurality of signals; and play the single digital representation of the plurality of signals in real-time to facilitate verification of the single digital representation of the plurality of signals such that a receiver is enabled to form at least one position, velocity, and time solution based on the verified single digital representation of the plurality of signals.

8. The system in accordance with claim 7, wherein said recorder is further configured to record sequentially a plurality of recording files that correspond to the plurality of digital representations such that one recording file of the plurality of recording files corresponds to a separate digital representation of the plurality of digital representations.

9. The system in accordance with claim 7, wherein said satellite vehicle is configured to transmit each of the plurality of signals in a sequence, said recorder is configured to receive each of the plurality of signals in the sequence.

10. The system in accordance with claim 9, wherein said recorder is configured to record the plurality of digital representations based on the sequence.

11. The system in accordance with claim 7, wherein said processor is configured to introduce a Doppler Effect and a propagation delay to each of the plurality of digital representations when said processing device processes the plurality of digital representations.

12. The system in accordance with claim 7, wherein said recorder is configured to record the plurality of digital representations of the plurality of signals by digitizing each of the plurality of signals to generate the plurality of digital representations and storing each of the plurality of digital representations onto a storage unit.

13. A method of verifying a plurality of signals, said method comprising:

receiving, via a recording device, a plurality of signals from a satellite vehicle based on a plurality of different space vehicle identification numbers that are within a same pre-defined period of time;

recording, via the recording device, a plurality of digital representations of the plurality of signals such that each digital representation of the plurality of signals corresponds to a different space vehicle identification number of the plurality of different space vehicle identification numbers that are within the same pre-defined period of time;

transmitting each of the plurality of digital representations of the plurality of signals from the recording device to the processing device;

interpolating each of the plurality of digital representations of the plurality of signals between a plurality of adjacent sampling points;

processing, via the processing device, the plurality of digital representations of the plurality of signals by re-sampling the plurality of digital representations by a plurality of phase shifting signals and multiplying each of the plurality of re-sampled digital representations by a plurality of phase shifting signals;

combining by summation the processed plurality of digital representations of the plurality of signals into a single digital representation of the plurality of signals;

store the single digital representation of the plurality of signals;

playing, via a play-back assembly that is coupled to the recording device and the processing device, the single digital representation of the plurality of signals in real-time to facilitate verification of the single digital representation of the plurality of signals; and forming at least one position, velocity, and time solution, via a receiver, based on the verified single digital representation of the plurality of signals.

14. The method in accordance with claim 13, further comprising recording sequentially, via the recording device, a plurality of recording files that correspond to the plurality of digital representations such that one recording file of the plurality of recording files corresponds to a separate digital representation of the plurality of digital representations.

15. The method in accordance with claim 13, wherein receiving a plurality of signals further comprises receiving the plurality of signals in a sequence.

16. The method in accordance with claim 15, wherein recording, via the recording device, a plurality of digital representations further comprises recording, via the recording device, the plurality of digital representations based on the sequence.

17. The method in accordance with claim 13, wherein processing the plurality of digital representations further comprises introducing a Doppler Effect and a propagation delay to each of the plurality of digital representations.

18. The method in accordance with claim 13, wherein recording, via the recording device, a plurality of digital representations of the plurality of signals further comprises: digitizing each of the plurality of signals to generate the plurality of digital representations; and storing each of the plurality of digital representations onto a storage unit.

* * * * *